United States Patent
Nakano (10) Patent No.: US 6,421,450 B2
(45) Date of Patent: *Jul. 16, 2002

(54) ELECTRONIC WATERMARK SYSTEM

(75) Inventor: Hirotaka Nakano, Tokyo (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/022,473

(22) Filed: Feb. 12, 1998

(30) Foreign Application Priority Data

Feb. 12, 1997 (JP) .............................. 9-027815

(51) Int. Cl.$^7$ ................................................ G06K 9/00
(52) U.S. Cl. ...................................... 382/100; 380/200
(58) Field of Search .................................. 382/100, 232, 382/250, 253; 380/54, 4, 3, 19, 21, 30, 42, 43, 49, 50, 232, 201, 203, 200; 705/56, 72, 75, 57, 58, 59

(56) References Cited

U.S. PATENT DOCUMENTS

| | | | |
|---|---|---|---|
| 5,291,598 A | | 3/1994 | Grundy |
| 5,530,759 A | | 6/1996 | Braudaway et al. .......... 380/54 |
| 5,719,938 A | * | 2/1998 | Haas et al. .................... 380/21 |
| 5,748,735 A | * | 5/1998 | Ganesan ..................... 380/21 |
| 5,848,155 A | * | 12/1998 | Cox .............................. 380/4 |
| 5,875,249 A | * | 2/1999 | Mintzer et al. ............... 380/54 |
| 5,915,027 A | * | 6/1999 | Cox et al. ..................... 380/54 |
| 5,933,620 A | * | 8/1999 | Lee et al. ................... 395/500 |
| 5,949,885 A | * | 9/1999 | Leighton ..................... 380/54 |
| 6,002,772 A | * | 12/1999 | Saito ........................... 380/49 |

FOREIGN PATENT DOCUMENTS

| | | |
|---|---|---|
| EP | 0 450 841 A2 | 10/1991 |
| JP | 8-241403 | 9/1996 |
| WO | WO 96 41468 A | 12/1996 |
| WO | WO 97 14087 A | 4/1997 |

OTHER PUBLICATIONS

J. Zhao, "A WWW Service to Embed and Prove Digital Copyright Watermarks," Proceedings of the European Conference on Multimedia Applications, Services and Techniques, vol. 2, May 28, 1996, pp. 695–709, p. 702; figure 2.

Komatsu et al., "Authentication System Using Concealed Image in Telematics," Memoirs of the School of Science and Engineering. Waseda University, No. 52, Jan. 1, 1988, pp. 45–60.

Article—"Constuction of Embedded Signature for Video Image"—Proceedings of the 1997 Symposium of Coding and Information Security, Jan. 1997.

NIKKEI ELECTRONICS Apr. 22, 1996 (No. 660).

* cited by examiner

Primary Examiner—Samir Ahmed
(74) Attorney, Agent, or Firm—Foley & Lardner

(57) ABSTRACT

An electronic watermark system invisibly embeds watermark information into original image data and the watermarked image data is transferred to a first medium. At the same time. the embedded watermark information is transferred to a second mediums. When a medium questioned is found, its watermark information can be easily identified by searching the second medium. Alternatively, the watermarked image data and the embedded watermark information are transferred to different storage areas of the same medium, respectively.

14 Claims, 8 Drawing Sheets

ELECTRONIC WATERMARK SYSTEM

BACKGROUND OF THE INVENTION

1. Field of the Invention

The present invention generally relates to an authorization system. and in particular to an authorization system using identification information embedded into image data to prevent unauthorized duplication of the image data.

2. Description of the Related Art

Recently, unauthorized copying of digital image data has become a serious problem because duplication of digital data can be extremely easy. To prevent unauthorized copying, several authorization system using identification information (an electronic watermark) embedded into image data have been proposed.

A visible-watermarking system is disclosed in Japanese Patent Unexamined Publication No. 8-241403 which corresponds to U.S. Pat. No. 5,530,759. In this system, a visible, watermark is placed on a digital image such that the corresponding pixel of original image changes its brightness but its chromaticities.

An invisible-watermarking system is disclosed in NIKKEI ELECTRONICS 1996.4.22 (no. 660). In this system, original image data is converted into frequency spectrum and then ID information is embedded into the frequency spectrum which is in turn converted into image data invisibly including the ID information. In authorization check, image data questioned is converted into frequency spectrum. ID information embedded In the image data questioned is obtained from a difference between the frequency spectrum questioned and the original frequency spectrum. Since the ID information is embedded into frequency spectrum of the original image data, it has little effect on the image quality and further it has become very difficult to delete the ID information from the image data.

In the above invisible-watermarking system, since the ID information cannot be seen, it is difficult to check whether image data is authorized in the case where no one knows the ID information. Especially, in a distribution system of data storing medium including CD-ROMs, there are cases where a different watermark is used for each distribution channel. In this case, the authorization check and manufacture management become very complicated and time-consuming jobs.

SUMMARY OF THE INVENTION

An object of the present invention is to provide a system which can rapidly check whether image data is authorized to effectively prevent unauthorized copying of the image data.

Another object of the present invention is to provide a system which can easily identify an electronic watermark invisibly embedded in image data to check whether the image data is authorized.

According to an aspect of the present invention, watermarked image data having watermark information invisibly embedded is transferred to a first medium and the embedded watermark information is transferred to a second medium. Since the embedded watermark information is stored in the second medium, watermark identification can be easily made.

Further, in an authorization check system for checking whether a medium questioned is authorized, a storage stores watermark information and medium identification information identifying a medium, the mediums storing watermarked image data which is produced by invisibly embedding the watermark information into original image data. A retrieval controller retrieves watermark information corresponding to medium identification information of the medium questioned from the storage. A watermark extractor extracts watermark information questioned from image data stored in the medium questioned. A checker checks whether the medium questioned is authorized by comparing the extracted watermark information with the retrieved watermark information.

According to another aspect of the present invention, watermarked image data having watermark information invisibly embedded and the embedded watermark information are both transferred to a single medium. Preferably, the embedded watermark information may be stored in a dedicated storage area of the single medium. Further, the embedded watermark information may be encrypted and stored. Since the embedded watermark information is stored in the same medium, watermark identification can be easily made.

Further, in an authorization check system for checking whether a medium questioned is authorized, the medium questioned having a first storage area for storing watermarked image data and a second storage area for storing watermark information. After extracting watermark information from image data stored in the medium questioned, a checker checks whether the medium question is authorized by comparing the extracted watermark information with the watermark information stored in the second storage area of the medium questioned.

DETAILED DESCRIPTION OF THE PREFERRED EMBODIMENTS

ENCODING SIDE

Figure 1:
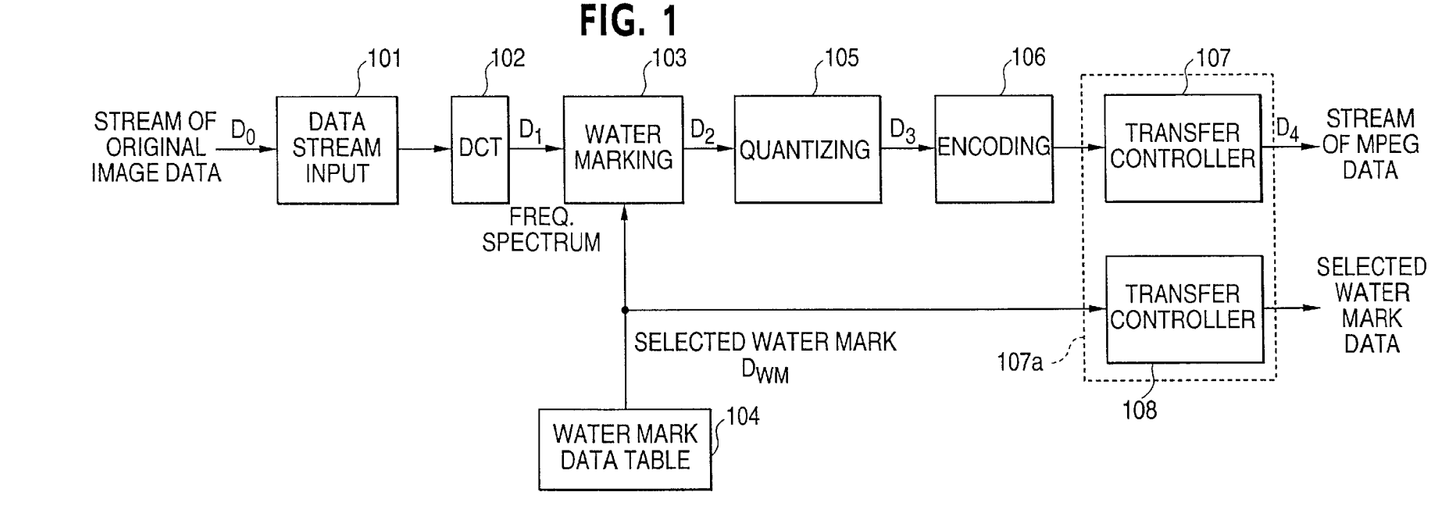
FIG. 1 in a schematic block diagram showing an encoding sit of an electronic watermark systems according to the present invention.

Referring to FIG. 1, an encoding side of an electronic watermark system inputs a stream of original image data $D_O$, and produces both MPEG (Motion Picture Experts Group) data stream $D_4$ and watermark data which is invisibly embedded into the MPEG data $D_4$. More specifically, a stream input section 101 inputs a stream of the original image data which is converted to frequency spectrum data $D_1$ by a DCT (Discrete Cosine Transform) section 102. A watermarking section 103 reads a watermark $D_{WM}$ selected from a plurality of watermarks stored in a watermark data table 104, and then embeds the selected watermark $D_{WM}$ into the frequency spectrum data $D_1$ to produce watermark-embedded frequency spectrum data $D_2$. The watermark-embedded frequency spectrum data $D_2$ is quantized by a quantizing section 105 and the quantized data $D_3$ is encoded to produce MPEG data by an encoding section 106. A transfer controller 107 inputs the MPEG data from the encoding section 106 to produce a stream of the MPEG data $D_4$ and a transfer controller 108 inputs the selected watermark $D_{WM}$ from the watermark data table 104 to produce selected watermark data. The stream of the MPEG data $D_4$ is transferred to a storage medium or a client through a commutation channel and the selected watermark data is transferred to another storage medium or the same storage medium, as will be described later (i.e., see FIGS. 5, 6 and 7A). Alternately, a transfer controller may transfer the watermark image to a first medium and the watermark information to as second medium utilizing a transfer controller as shown by the dotted line 107a in FIG. 1.

It should be noted that the above sections 101–106 may be implemented with a program-controlled processor such as CPU or DSP. In other words, the processor runs programs including the functions of the above section 101–106 to perform the watermarking and MPEG data compression as described above.

WATERMARK CHECKING SECTION

Figure 2:
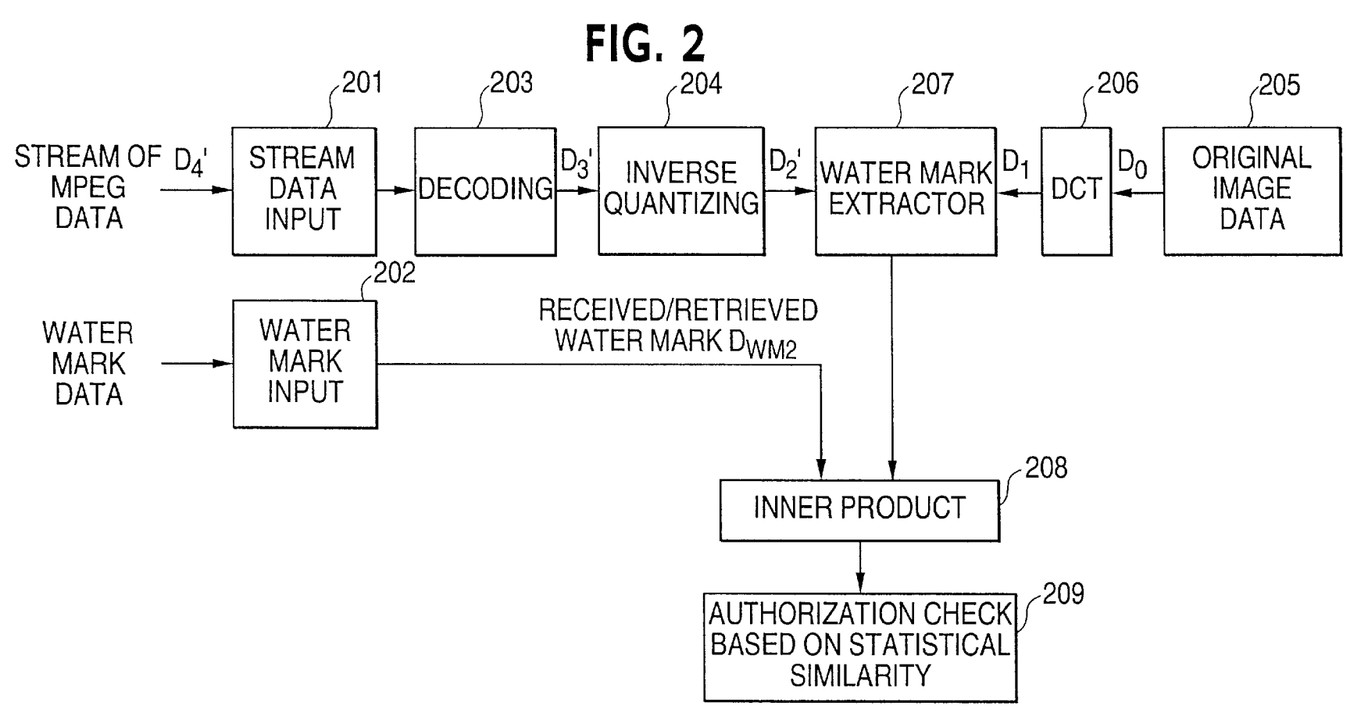
FIG. 2 is a schematic block diagram showing a watermark check section of the electronic watermark system according to the present invention.

Referring to FIG. 2, in a watermark checking section of the electronic watermark system, a stream data input section 201 inputs a stream of MPEG data $D_4'$ and a watermark input section 202 inputs watermark data associated with the input MPEG data $D_4'$. The input MPEG data $D_4'$ is decoded to produce data $D_3'$ by a decoding section 203 and then the data $D_3'$ is inverse-quantized to produce data $D_2'$ by an inverse-quantizing section 204. On the other hand, the watermark checking section is provided with an original image memory 205 storing the original image data $D_0$. The original image data $D_0$ is converted to frequency spectrum data $D_1$ by a DCT section 206.

When receiving the input frequency spectrum data $D_2'$ from the DCT section 204 and the original frequency spectrum data $D_1$ from the DCT section 206, a watermark extractor 207 extracts a watermark $D_{WM1}$ from the input frequency spectrum data $D_2'$ by calculating a difference between the input frequency spectrum data $D_2'$ and the original frequency spectrum data $D_1$. An inner product calculating section 208 inputs the extracted watermark $D_{WM1}$ from the watermark extractor 207 and the received watermark $D_{WM2}$ from the watermark input section 202, and performs the inner product thereof to produce a degree of statistical similarity between them. An authorization check section 209 checks whether the extracted watermark $D_{WM1}$ is Identical to the received watermark $D_{WM2}$ by comparing the degree of statistical similarity with a reference value.

The input MPEG data $D_4'$ may be received from a storage medium or a communication network. The water k data associated with the input MPEG data $D_4'$ is received from a management database storing manufacture management data or the same storage medium as the MPEG data $D_4'$, as will be described later. In the case where the input MPEG data $D_4'$ and/or the water k data are received from a communication network, the watermark checking section is provided with a communication ms such as a network interface or a radio transceiver.

It should be noted that the above sections 201–209 may be implemented with a program-controlled processor such as CPU or DSP. In other words, the processor runs programs including the functions of the above section 201–209 to perform the watermark extracting, MPEG data decompression and authorization check as described above.

WATERMARKING

Figure 3:
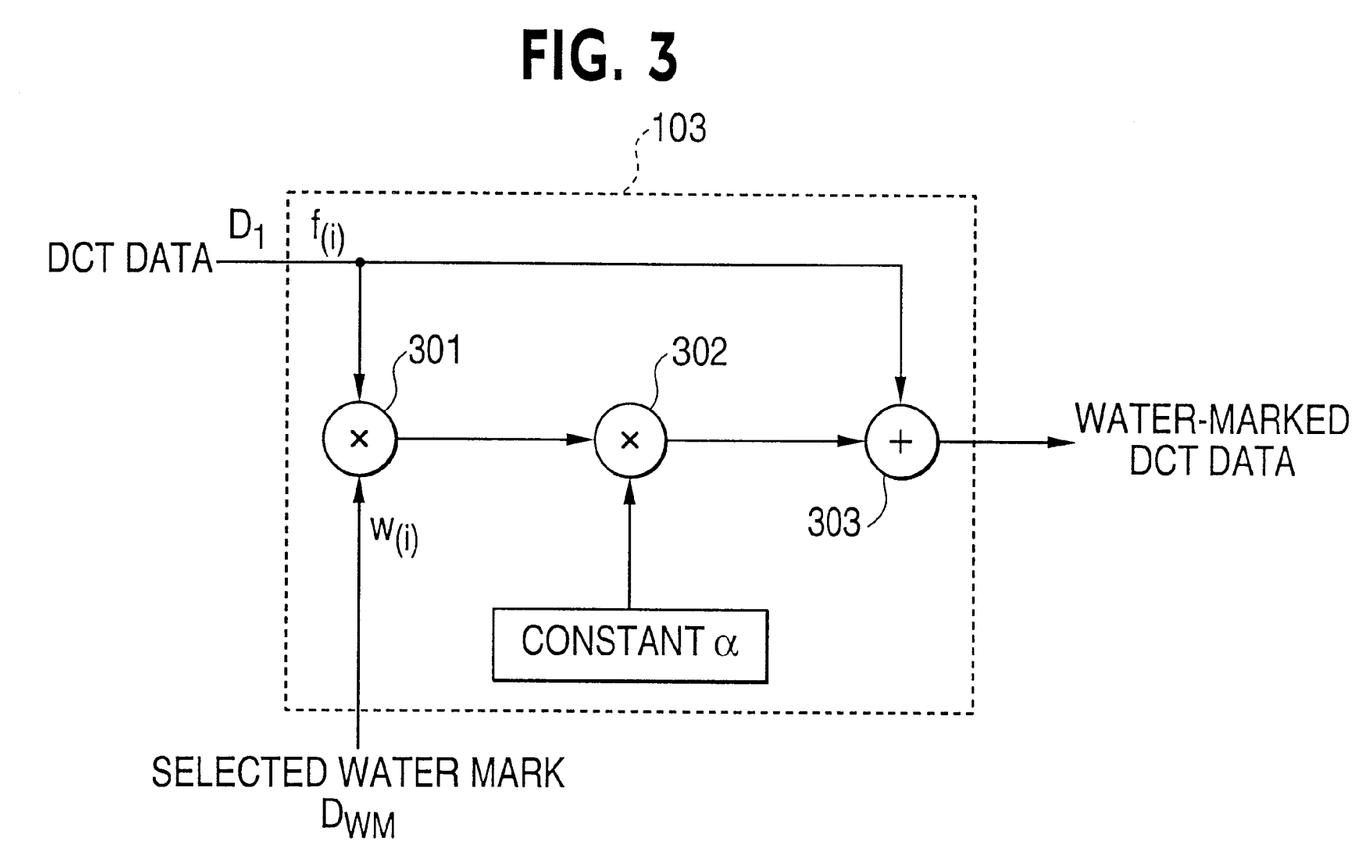
FIG. 3 is a schematic diagram showing an example of watermarking section of the encoding side of FIG. 1.

Referring to FIG. 3, the watermarking section 103 receives the frequency spectrum data $D_1$ from DCT section 102 and selects a set of N date samples: f(1)–f(n) which are greater than a predetermined threshold level from the frequency spectrum data $D_1$. Further, the watermarking section 103 selects a get of watermark data: w(1)–w(n) from random numbers depending on a normal distribution with a mean of 0 and a variance of 1. The watermarking section 103 calculates F(i) f(i)+α|f(i)|*(i) for each variable i ($1 \leq i \leq n$) using multipliers 301 and 302, a constant α and an adder 303, where α it a scaling element (hereinafter, assuming α=1). The calculated data samples F(1)–F(n) are substituted for the selected N data samples f(1)–f(n) of the frequency spectrum data $D_1$ to produce watermarked DCT frequency spectrum data which will be subject to inverse DCT In the following stage 105. In this manner, the selected watermark $D_{WM}$ is invisibly embedded into the original image data $D_0$.

WATERMARK CHECK

Figure 4:
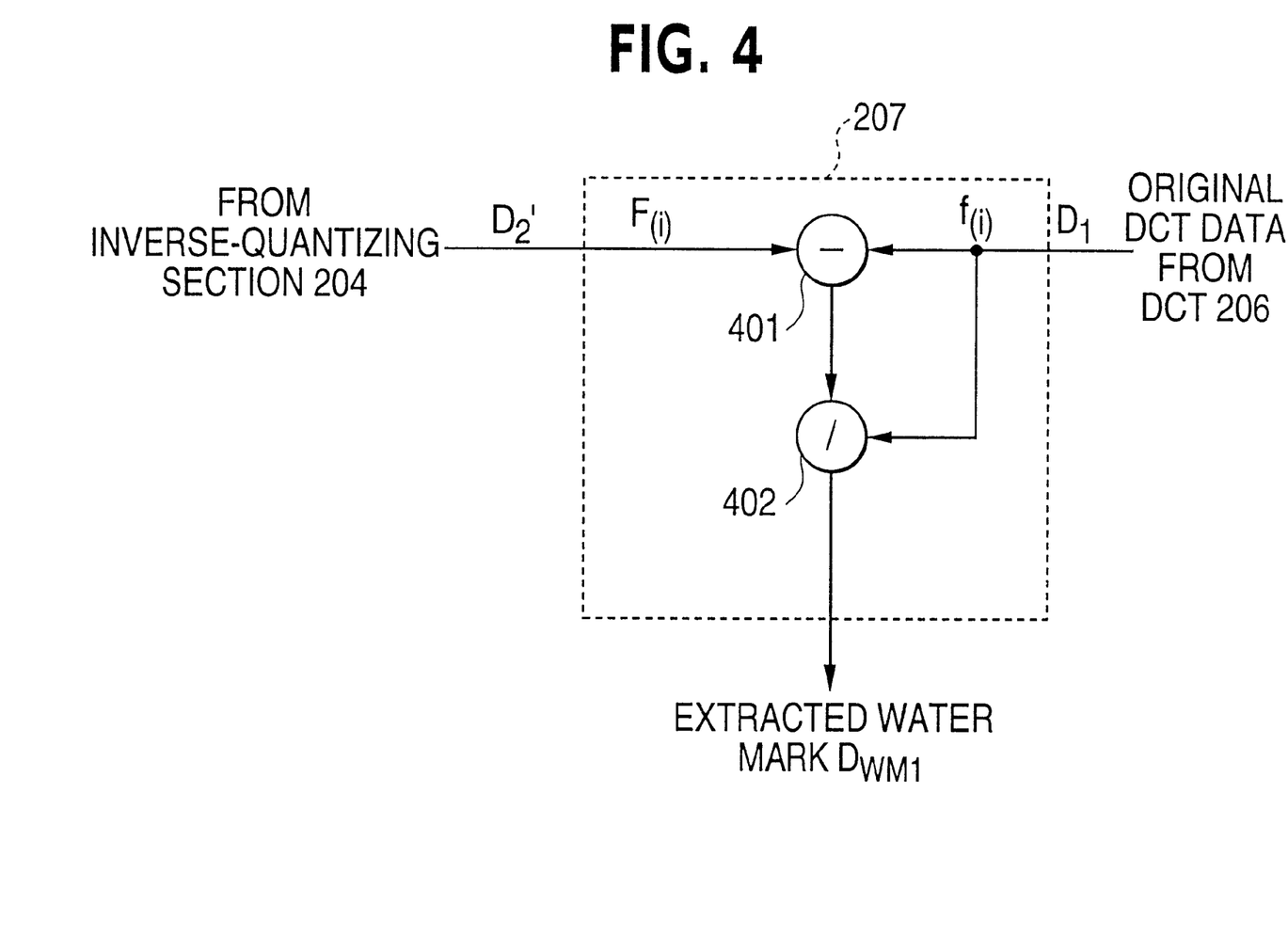
FIG. 4 is a schematic diagram showing an example of a watermark extractor of the watermark check section of FIG. 2.

Referring to FIG. 4, the watermark extractor 207 inputs the received data samples F(1)–F(n) of the received frequency spectrum data $D_2'$ and the original data samples f(1)–f(n) of the original frequency spectrum data $D_1$. The watermark extractor 207 calculates $w_1$(i)–(F(i)–f(i))/f(i) for each variable i ($1 \leq i \leq n$) using subtracter 401 and a divider 402 to extract the watermark $D_{WM1}=(W_1(1), W_1(2), \ldots W_1(n))$.

Subsequently, the inner product calculating section 208 calculates a degree of statistical similarity C between the extracted watermark $D_{WM1}=(W_1(1), W_1(2), \ldots W_1(n))$ and the received watermark $D_{WM2}=(W_2(1), W_2(2), \ldots, W_2(n))$ using the following equation: $C=D_{WM1}*D_{WM2}/|D_{WM1}|*|D_{WM2}|$. If C is equal to or greater than the predetermined level, it is determined that the received watermark is embedded into the received MPEG data $D_4'$ and therefore the received MPEG data $D_4'$ is the authorized data. If C is smaller than the predetermined level, it is determined that the received MPEG data $D_4'$ is an unauthorized duplication.

FIRST EMBODIMENT

Figure 5:
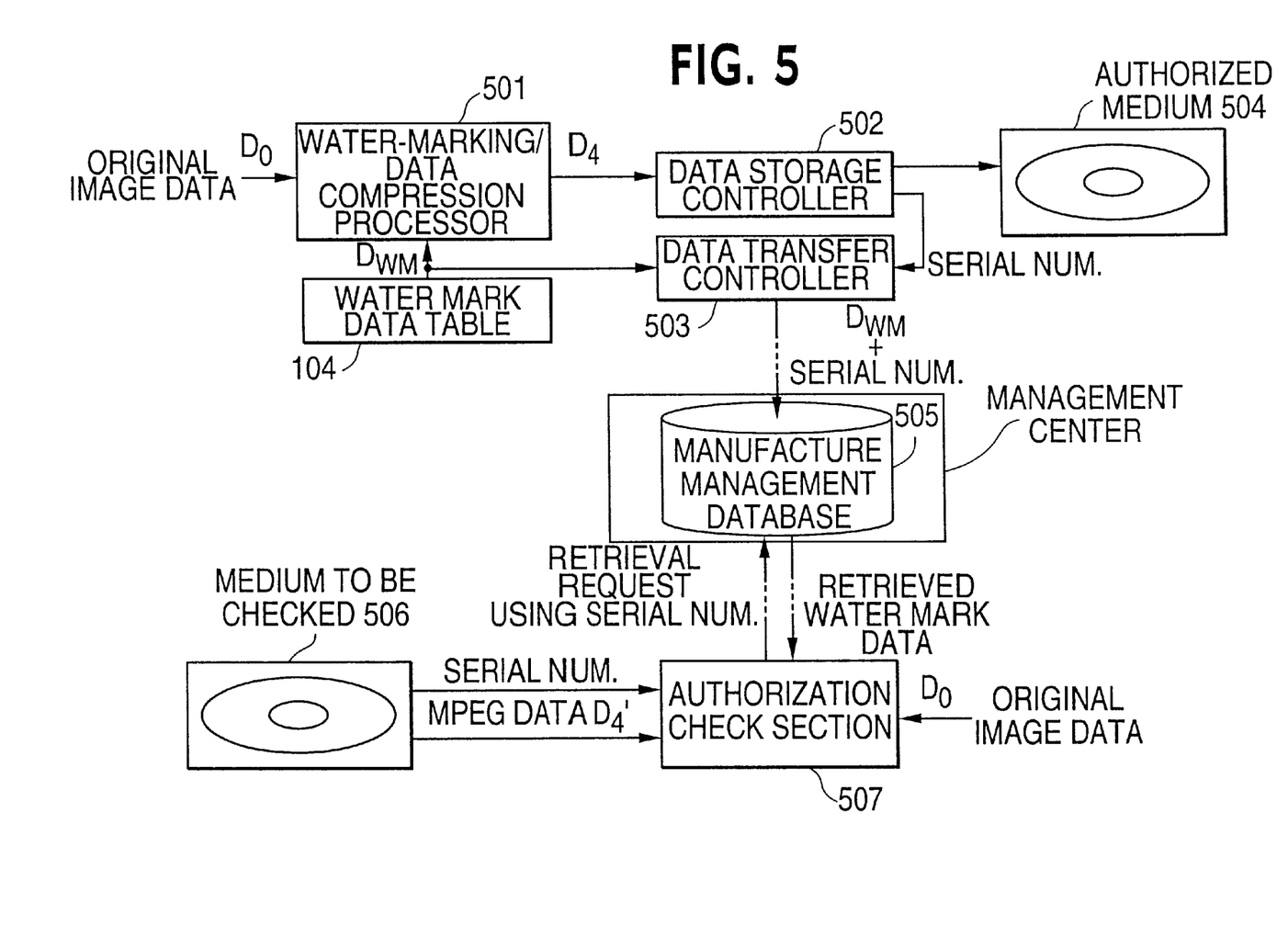
FIG. 5 is a diagram showing a first embodiment of an electronic watermark system according to the present invention.

Referring to FIG. 5, the encoding side of the electronic watermark system is comprised of a processor 501, the watermark data table 104, a data storage controller 502 and a data transfer controller 503. As described before. the processor 501 runs programs including the functions of the sections 101–106 as shown in FIG. 1 to perform the watermarking and MPEG data compression.

The processor 501 inputs a stream of original image data $D_0$ and produces the water-marked MPEG data stream $D_4$ which is stored onto a storage medium 504 such as CD-ROM or magneto-optic disc by the data storage controller 502. At the same time, the data storage controller 502 outputs a serial number of the storage medium 504 to the data transfer controller 503. In this manner, an authorized medium 504 storing MPEG data stream $D_4$ into which the selected watermark data $D_{WM}$ is embedded is manufactured. IF the processor 501 selects another watermark data, an authorized medium 504 storing the same MPEG data stream $D_4$ into which a different watermark data is embedded is easily manufactured. Needless to say, the data storage controller 502 outputs the serial, number of the storage medium 504 to the data transfer controller 503.

The data transfer controller 503 inputs the embedded watermark data $D_{WM}$ from the watermark data table 104 and then transfers a pair of the embedded watermark data $D_{WM}$ and the serial number of the storage medium 504 to a manufacture management database 505 provided in a management center. Therefore, the watermark for each authorized medium 504 can be easily identified by searching the manufacture management database 505, in the case where the management center is located at a distance from the encoding side, the data transfer controller 503 may transfer them through a local-area network or a radio communication channel.

When a suspect medium 506 is found, the authorization check is performed by an authorization check section 507 running the programs Including the functions of the above sections 201–209 as shown in FIG. 2 to perform the watermark extracting, MPEG data decompression and authorization check. In this case, the authorization check section 507 includes data communication means.

First of all, the authorization check section 507 reads the serial number from the suspect medium 506 and transmits a retrieval request using the read serial number to the manufacture management database 505 through a network. Upon receipt of the retrieval request, the manufacture management database 505 is searched for the corresponding watermark to the serial number. If the corresponding watermark is found, the retrieved watermark data is sent back to the authorization check section 507.

Using the retrieved watermark data, the authorization check section 507 perform the watermark extracting and watermark checking operations as described before. That is, if the degree of statistical similarity C between the extracted watermark and the retrieved watermark Is equal to or greater than the predetermined level, it is determined that the medium 506 is one of authorized media. If C is smaller than the predetermined level, it is determined that the mediums 506 is an unauthorized duplication.

SECOND EMBODIMENT

Figure 6:
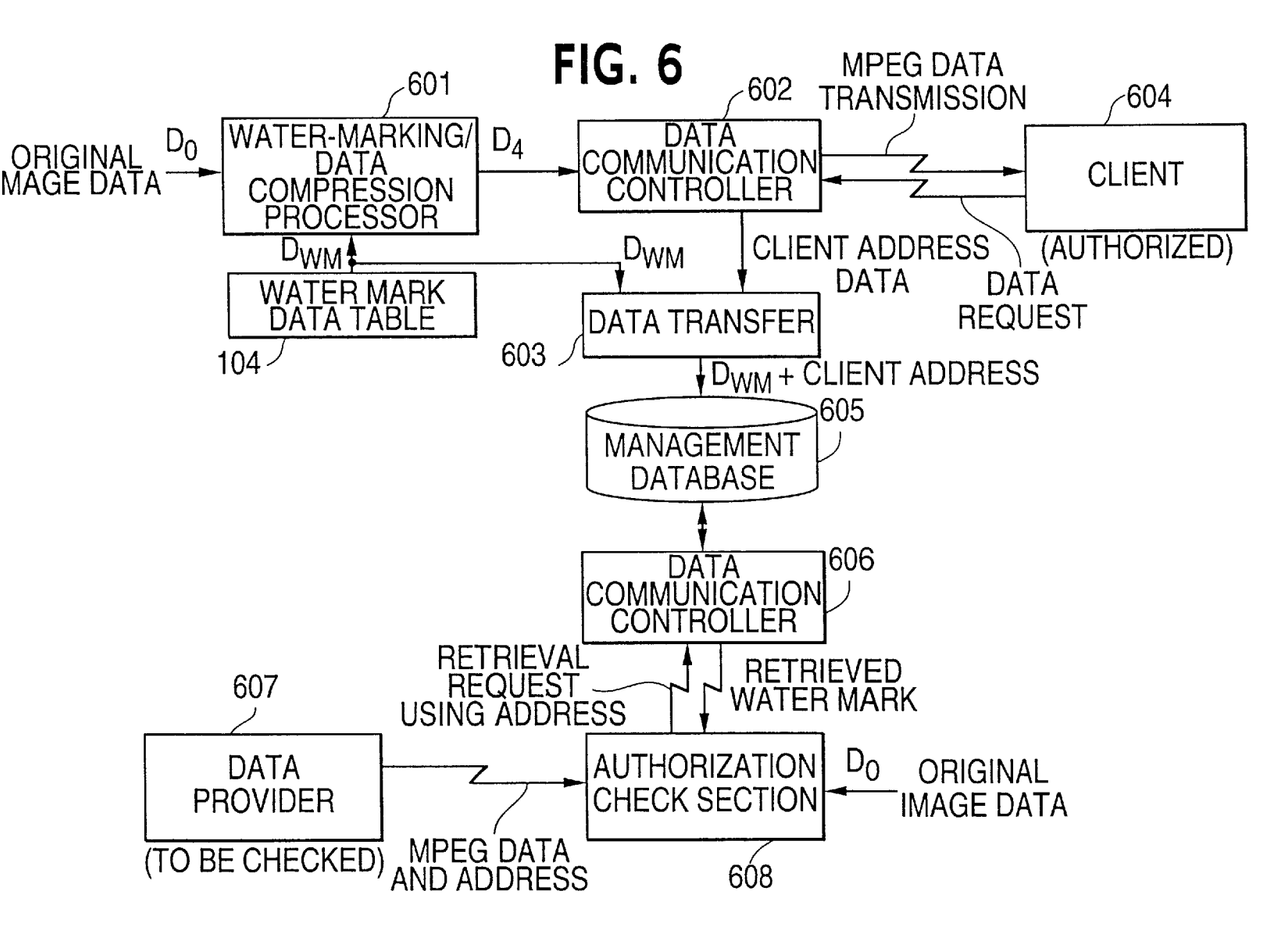
FIG. 6 is a diagram showing an electronic watermark system according to a second embodiment of the present invention.

Referring to FIG. 6, the encoding side of the electronic watermark system is comprised of a processor 601, the watermark data table 104, a data communication controller 602 and a data transfer controller 603. As described before, the processor 601 runs programs including the functions of the sections 101–106 as shown in FIG. 1 to perform the watermarking and MPEG data compression.

The processor 601 inputs a stream of original image data $D_0$ and produces the water-marked MPEG data stream $D_4$ which is transmitted to a client 604 by the data communication controller 602. Here, it is assumed that the water-marked MPEG data is distributed depending on a data transmission request received from the client 604. At the same time, the data communication controller 602 outputs the address number of the client 604 to the data transfer controller 603. In this manner, is MPEG data stream $D_4$ into which the selected watermark data $D_{WM}$ is embedded is transmitted to the authorized client 604. If the data transmission request is received from another client, the processor 601 selects another watermark data which is embedded into the MPEG data. The MPEG data stream $D_4$ into which a different watermark data is embedded is transmitted to the new client. Needless to say, the data storage controller 602 outputs the address number of that new client to the data transfer controller 603.

The data transfer controller 603 inputs the embedded watermark data $D_{WM}$ from the watermark data table 104 and then transfers a pair of the embedded watermark data $D_{WM}$ and the client address number to a manufacture management database 605 provided in a management center. Therefore, the watermark for each authorized client 604 can be easily identified by searching the manufacture management database 605. In the case where the management center is located at a distance from the encoding side, the data transfer controller 603 may transfer them through a local-area network or a radio communication channel. Further the management database 605 is provided with data communication controller 606.

When a suspect data provider 607 is found, the authorization check is performed by an authorization check section 608 running the programs including the functions of the above sections 201–209 as shown in FIG. 2 to perform the watermark extracting, MPEG data decompression and authorization check. In this case, the authorization check section 508 includes data communication means.

First of all, the authorization check section 608 receives the address number from the suspect data provider 607 and transmits a retrieval request using the address number to the manufacture management database 605 through the data communication controller 606. Upon receipt of the retrieval request, the manufacture management database 605 is searched for the corresponding watermark to the address number. If the corresponding watermark is found, the retrieved watermark data is sent back to the authorization check section 608.

Using the retrieved watermark data the authorization check section 608 perform the watermark extracting and watermark checking operations as described before. That is, if the degree of statistical similarity C between the extracted watermark and the retrieved watermark is equal to or greater than the predetermined level, it is determined that the data provider 607 is one of authorized clients. If C is smaller than the predetermined level, it is determined that the data provider 607 distributes an unauthorized duplication.

THIRD EMBODIMENT

Figure 7A:
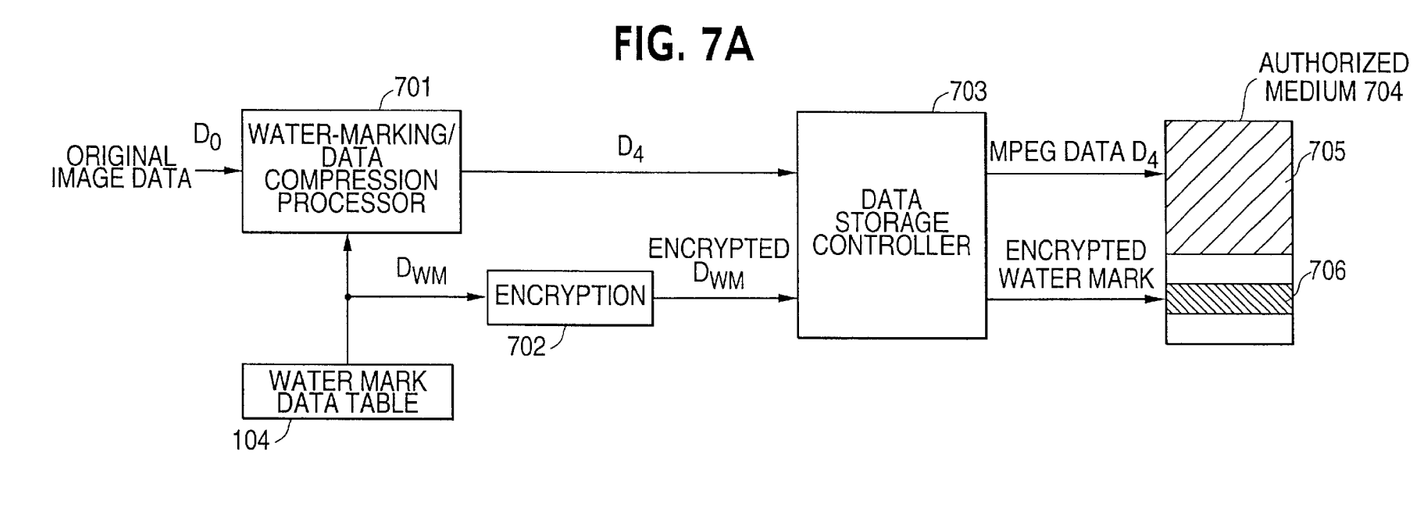
FIG. 7A is a schematic diagram showing an encoding side of an electronic watermark system according to a third embodiment of the present invention.

Referring to FIG. 7A. the encoding side of the electronic watermark system is comprised of a processor 701, the watermark data table 104, an encryption section 702 and a data storage controller 703. As described before, the processor 701 runs program including the functions of the sections 101–106 as shown in FIG. 1 to perform the watermarking and MPEG data compression. Further, the processor 701 may include the encryption section 702 and the data storage controller 703.

The processor 701 inputs a stream of original image data $D_0$ and produces the water-marked MPEG data stream $D_4$ which is stored onto a storage medium 704 such as CD-ROM or magneto-optic disc by the data storage controller 703. At the same time, the encryption section 702 encrypts the selected watermark data $D_{WM}$ and the encrypted watermark data is stored onto the same storage medium 704 by the data storage controller 703. It is preferably that the storage medium 704 has a first area 705 for storing the water-marked MPEG data and a second area 706 dedicated to the encrypted watermark data. In the case of MPEG data reading mode, no data can read from the second area 706.

In this manner, an authorized medium 704 storing the encrypted watermark data $D_{WM}$ and the watermarked MPEG data stream $D_4$ is manufactured. If the processor 701 selects another watermark data, an authorized medium 704 storing the new watermark data and the same MPEG data stream $D_4$ into which the new watermark data is embedded is easily manufactured.

Figure 7B:
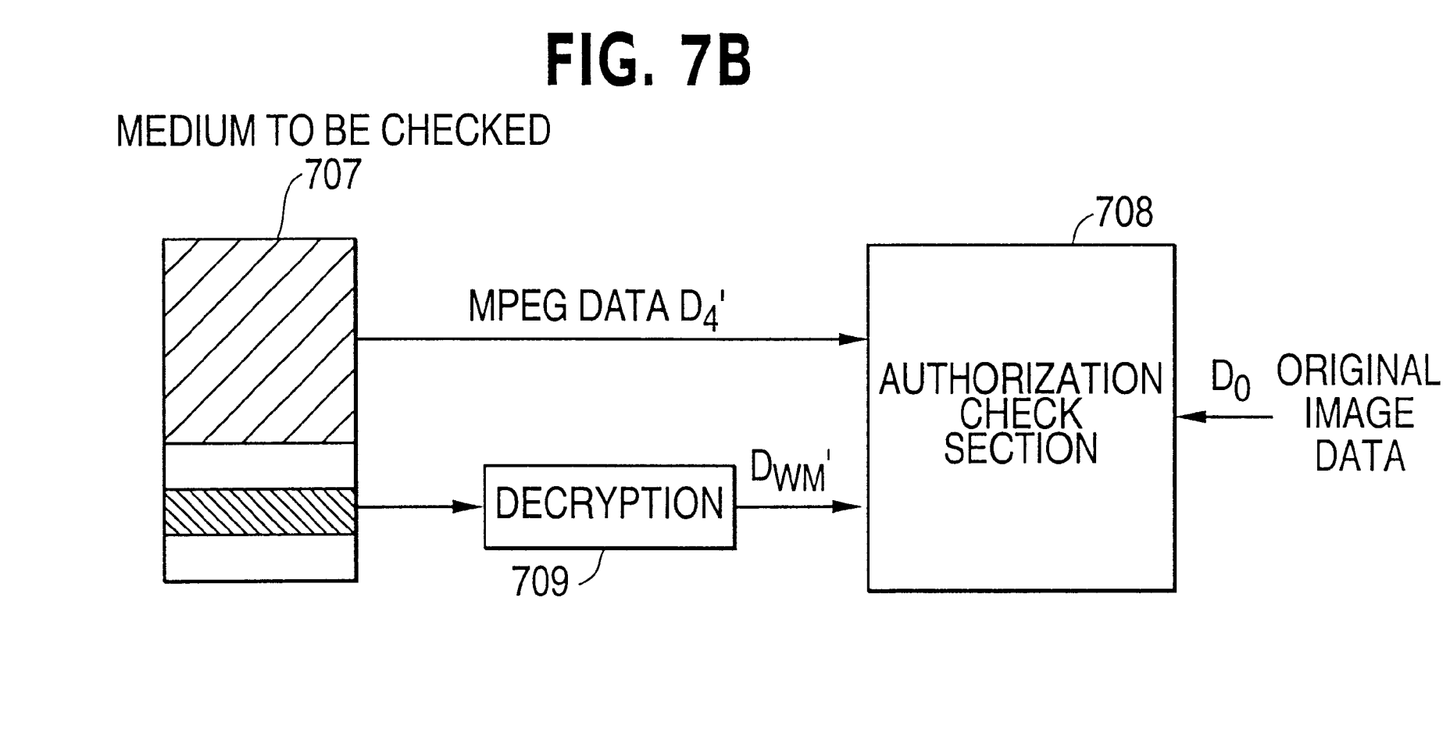
FIG. 7B is a schematic diagram showing a decoding side of the electronic watermark system according to the third embodiment.

Referring to FIG. 7B, when a suspect medium 707 is found, the authorization check is performed by cm authorization check section 708 running the programs including the functions of the above sections 201–209 as shown in FIG. 2 to perform the watermark extracting, MPEG data depression and authorization check. In this case, the authorization check section 708 includes decryption section 709.

First of all, the decryption section 709 reads the watermark data from the second area dedicated to watermark of the suspect medium 707 and decrypts it to output watermark data $D_{WM}'$ to the authorization check section 708. Using the read watermark data $D_{WM}'$, the authorization check section 708 performs the watermark extracting and watermark checking operations as described before. That is, if the degree of statistical similarity C between the extracted watermark and the read watermark $D_{WM}'$ is equal to or greater than the predetermined level, it is determined that the medium 707 is one of authorized media. If C is smaller than the predetermined level, it is determined that the medium 707 is an unauthorized duplication.

As described above, since the authorized watermark can be easily obtained from a management center or the storage medium storing the watermarked MPEG data, the authorization check is rapidly performed with reliability.

What is claim is:

1. A system comprising:
   an information generator for generating watermark information;
   a combiner for invisibly embedding the watermark information into original image data to produce watermarked image data; and
   at least one transfer controller for separately transferring the watermarked image data and the watermark information received from the information generator to a first storage medium and a second storage medium, respectively and watermark information not including a verification key for decoding the watermark image data wherein the first medium and second medium are physically in the same location;
   wherein said transfer controller encrypts the watermark information for storage only in the second medium which is dedicated to the encrypted watermark information so that only the encrypted watermark information is allowed to be read.

2. The system according to claim 1, wherein the at least one transfer controller further transfers medium identification information identifying the first storage medium to the second storage medium.

3. The system according to claim 2, wherein the second storage medium stores the encrypted watermark information and the medium identification information to allow retrieval.

4. The system according to claim 3, wherein the medium identification information is a manufacture serial number of the first storage medium.

5. A system comprising:
   an information generator for generating watermark information:
      a combine for invisibly embedding the watermark information into original image data to produce watermarked image data; and
   a transfer controller for transferring both the watermarked image data and the watermark information received from the information generator from the combine to a single medium, said watermark information not including a verification key for decoding the watermarked image data;
   wherein the transfer controller encrypts the watermark information and transfers encrypted watermark information to the single medium; and
   wherein in the single medium is a storage medium having a first storage area for storing the watermarked image data and a second storage area for storing the encrypted watermark information, wherein the second storage area is dedicated to the encrypted watermark information so that only the encrypted watermark information is allowed to be read.

6. An authorization check system for checking whether a medium questioned is authorized, the medium questioned having a first storage area for storing watermarked image data and a second storage area for storing encrypted watermark information, the system comprising:
   a watermark extractor for extracting said encrypted watermark information questioned from image data stored in the medium questioned using the original image data and not utilizing a verification key for extracting said encrypted watermark information; and
   a checker for checking whether the medium questioned is authorized by comparing the extracted encrypted watermark information with the encrypted watermark information stored in the second storage area of the medium questioned;
   wherein the second storage area is dedicated to the encrypted watermark information so that only the encrypted watermark information is allowed to be read.

7. A method for checking whether a medium questioned is authorized, comprising the steps of:
   generating watermark information;
   generating encrypted watermark information;
   invisibly embedding the watermark information into original image date to produce watermarked image data;
   transferring the watermarked image data to a first storage area of an authorized storage medium and the encrypted watermark information a second storage area of the authorized storage medium;
   extracting watermark information stored in the medium questioned; and
   extracting watermark information from watermarked image data stored in the medium question using the original image data and not utilizing a verification key for extracting said watermark information;
   checking whether the medium questioned is authorized by comparing the extracted watermark information with watermark information stored in the medium questioned; and
   wherein the second storage area is dedicated to the encrypted watermark information so that only the encrypted watermark information is allowed to be read.

8. The method according to claim 7, wherein the authorized medium is a storage medium having a first storage area for storing the watermarked image data and a second storage area. for storing the watermark information, wherein the second storage area to dedicated to the watermark information so that only the watermark information is readable therefrom.

9. The method according to claim 8, wherein the watermark information is encrypted and encrypted watermark information is stored to the authorized medium.

10. The system according to claim 1, wherein the information generator generates the watermark information from a plurality of watermark information candidates.

11. The system according to claim 5, wherein the information generator generates the watermark information from a plurality of watermark information candidates.

12. The method according to claim 7, wherein the step of generating the watermark information includes the step of selecting the watermark information from a plurality of watermark information candidates.

13. The method according to claim 7, wherein the watermarked image data and the watermark information are transferred over a network.

14. The method according to claim 13, wherein the watermarked image data and the watermark information are transferred over the same network.

* * * * *